US006175474B1

(12) United States Patent
Boutaghou et al.

(10) Patent No.: US 6,175,474 B1
(45) Date of Patent: Jan. 16, 2001

(54) BASE PLATE WITH IMPROVED TORQUE RETENTION

(75) Inventors: Zine-Eddine Boutaghou, Vadnais Heights; Richard August Budde, Plymouth, both of MN (US)

(73) Assignee: Seagate Technology LLC, Scotts Valley, CA (US)

( * ) Notice: Under 35 U.S.C. 154(b), the term of this patent shall be extended for 0 days.

(21) Appl. No.: 09/457,800

(22) Filed: Dec. 9, 1999

Related U.S. Application Data

(60) Continuation of application No. 09/236,823, filed on Jan. 25, 1999, now Pat. No. 6,038,103, which is a division of application No. 08/966,312, filed on Nov. 7, 1997, now Pat. No. 5,896,646.
(60) Provisional application No. 60/046,318, filed on May 13, 1997.

(51) Int. Cl.⁷ ....................................................... G11B 5/48
(52) U.S. Cl. ............................................................. 360/244.6
(58) Field of Search ..................... 360/240, 244.6–246.3, 360/246.7

(56) References Cited

U.S. PATENT DOCUMENTS

| 3,744,008 | 7/1973 | Castellani . | |
|---|---|---|---|
| 4,796,122 | 1/1989 | Levy et al. | 360/98.01 |
| 5,097,584 | 3/1992 | Cain et al. | 29/407 |
| 5,124,855 | 6/1992 | Dew et al. | 360/97.02 |
| 5,262,911 | 11/1993 | Cain et al. . | |
| 5,444,587 | 8/1995 | Johnson et al. . | |
| 5,471,733 | 12/1995 | Bernett et al. . | |
| 5,497,282 | 3/1996 | Hoffmann et al. . | |
| 5,631,789 | 5/1997 | Dion et al. . | |
| 5,657,531 | 8/1997 | Sato et al. | 29/603.04 |
| 5,677,815 | 10/1997 | Chan . | |
| 5,717,545 | 2/1998 | Brooks, Jr. et al. . | |
| 5,796,555 | 8/1998 | Aoyagi et al. . | |
| 5,828,521 | 10/1998 | Hasegawa . | |
| 5,860,206 | 1/1999 | Tochiyama . | |
| 5,870,252 | 2/1999 | Hanrahan . | |

Primary Examiner—Allen T. Cao
(74) Attorney, Agent, or Firm—Kinney & Lange, P.A.

(57) ABSTRACT

A base plate is used to attach the head/gimbal assembly of a disc drive to an actuator arm. The base plate has a boss which fits into an opening in the actuator arm. In one embodiment, the boss includes a plurality of raised portions defining a cylinder having a relaxed outer diameter greater than the inner diameter of the opening in the actuator arm. The outer surfaces of the plurality of portions engage the inner surface of the actuator arm to elastically deform and conform to and bias against the inner surface of the actuator arm, thereby providing a connection with superior holding friction, and retention torque.

12 Claims, 2 Drawing Sheets

BASE PLATE WITH IMPROVED TORQUE RETENTION

CROSS REFERENCE TO RELATED APPLICATION

This application is a continuation of Application Ser. No. 09/236,823 filed Jan. 25, 1999, now U.S. Pat. No. 6,038,103, which is a divisional of application Ser. No. 08/966,312 filed Nov. 7, 1997, now U.S. Pat. No. 5,896,646, which in turn claims priority from U.S. Provisional Application No. 60/046,318 filed May 13, 1997 for "A Base Plate With Improved Torque Retention" by Zine-Eddine Boutaghou and Richard Budde.

BACKGROUND OF THE INVENTION

The present invention relates to improvements in disc drive assemblies, and more particularly, the invention relates to an improved base plate for mounting the head/gimbal assembly of a magnetic disc drive to an actuator arm.

In disc drives, the head/gimbal assembly is attached to the actuator arm by swaging a base plate to the actuator arm. The base plate holds the head/gimbal assembly in place and restricts relative movement during subsequent assembly, transportation, shipping and operation of the disc drive. Typically, both the base plate and the actuator arm are constructed of metal materials. For example, a stainless steel base plate may be swaged to an extruded aluminum actuator arm.

In order to swage the base plate into the actuator arm, a tubular boss of the base plate is fit into an opening in the actuator arm. A ball is then driven through the tubular boss. Because the boss has an inner diameter smaller than the outer diameter of the ball, the ball exerts a deforming load on the boss. The boss plastically deforms to press against the opening walls in the actuator arm as the ball passes through the boss. To hold the head/gimbal assembly in place, the interface between the base plate and the actuator arm must develop a suitable minimum retention torque, preferably at least about ten inch-ounces. The amount of retention torque in a swage connection is dictated by the frictional force between the swaged members, which in turn is based on the friction between the boss material and the actuator arm material, the residual stresses in the boss of the swage, and the elastic stress in the actuator arm.

The frictional force developed between two surfaces depends on the coefficient of friction between the two surfaces, and the force perpendicular to the plane of relative motion between the two surfaces, or normal force. Thus, the friction between the outer surface of the boss and the inner surface of the opening in the actuator arm is dependant on the force exerted perpendicular to the interface (the normal force) between the boss and the actuator arm and the coefficient of friction between the two surfaces.

In the past the materials used to construct the actuator arm and the base plate were metal, such as aluminum and steel. In a swage connection, both the boss and the arm deformed during swaging, smoothing both metal surfaces, and creating a somewhat smooth interface between the metals. Neither the boss nor the arm returned to its original dimensions after the deforming load was released. As a result, no force is necessary to maintain the boss' and arm's newly deformed dimensions, once they have been deformed by the ball. The resulting smooth interface of the swage connection diminished the coefficient of friction between the boss and the actuator arm, a typical coefficient of friction between a stainless steel base plate and aluminum actuator arm that are swaged together is in the range of 0.1 to 0.3.

BRIEF SUMMARY OF THE INVENTION

In one embodiment of the invention, the base plate comprises a plurality of portions defining a cylinder having an outer surface with a relaxed outer diameter greater than the inner diameter of the opening in the actuator arm. The boss is insertable into the opening in the actuator arm. As the boss engages the opening in the actuator arm the plurality of portions elastically deform to conform to and bias against the inner surface of the actuator arm. In one form of this second embodiment, the actuator arm and base plate are constructed of polymer material having a yield stress in the range 4 to 9 Kpsi and a modulus of elasticity in the range 145 to 450 Kpsi.

Another aspect of the present invention is a method for securing the head/gimbal assembly of a disc drive to an actuator arm with a base plate. The base plate boss has a plurality of portions defining a cylinder having an outer diameter greater than the inner diameter of the opening in the actuator arm. The head assembly is sandwiched between the base plate and the actuator arm so that the raised portions of the base plate is aligned with the opening of the head assembly. The raised cylinder is then pressed into the opening in the actuator arm so that the plurality of portions elastically deform to conform to and bias against the inner surface of the opening in the actuator arm.

The present invention overcomes the limitations inherent in swaging the base plate to the actuator arm. The boss is elastically deformed to fit into the opening in the actuator arm, permitting the boss to return to its original shape and dimensions when the deforming load is released. Because the opening in the actuator arm continuously applies the deforming load on the boss, a significant normal force is created between the two surfaces. As a result, a high frictional force, and therefore a high retention torque, is created between the boss and the actuator arm.

DETAILED DESCRIPTION OF THE PREFERRED EMBODIMENTS

Figure 1:
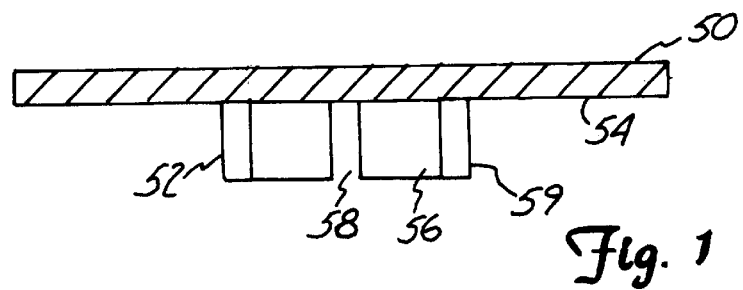
FIG. 1 is a section view of a base plate according to the present invention.
Figure 3:
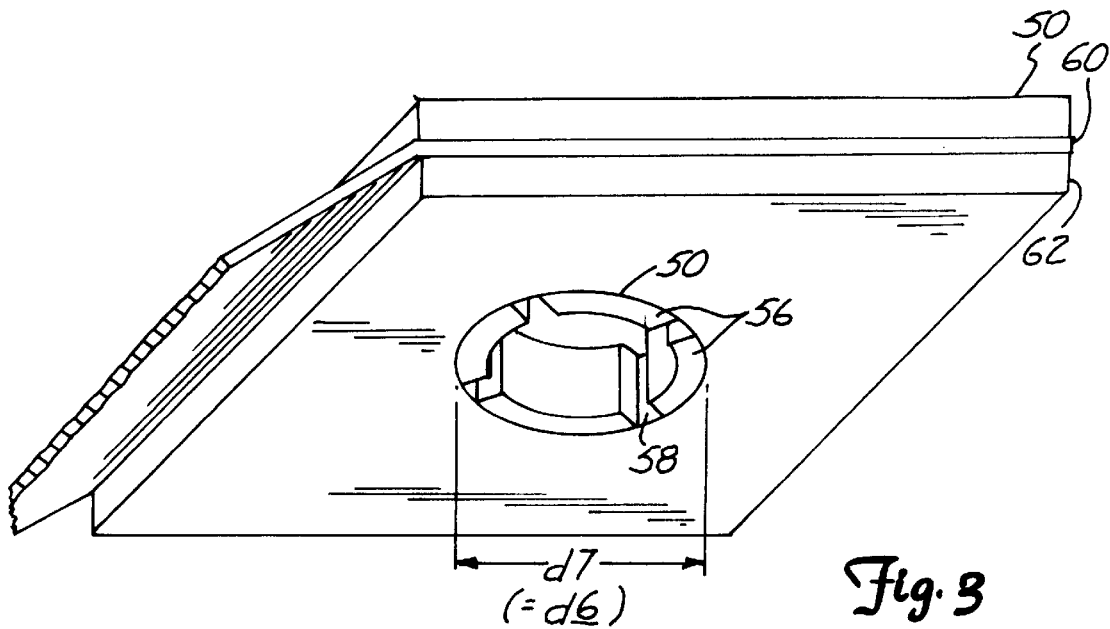
FIG. 3 shows the final assembly of the base plate with an actuator arm and head/gimbal assembly according to the present invention.
Figure 2:
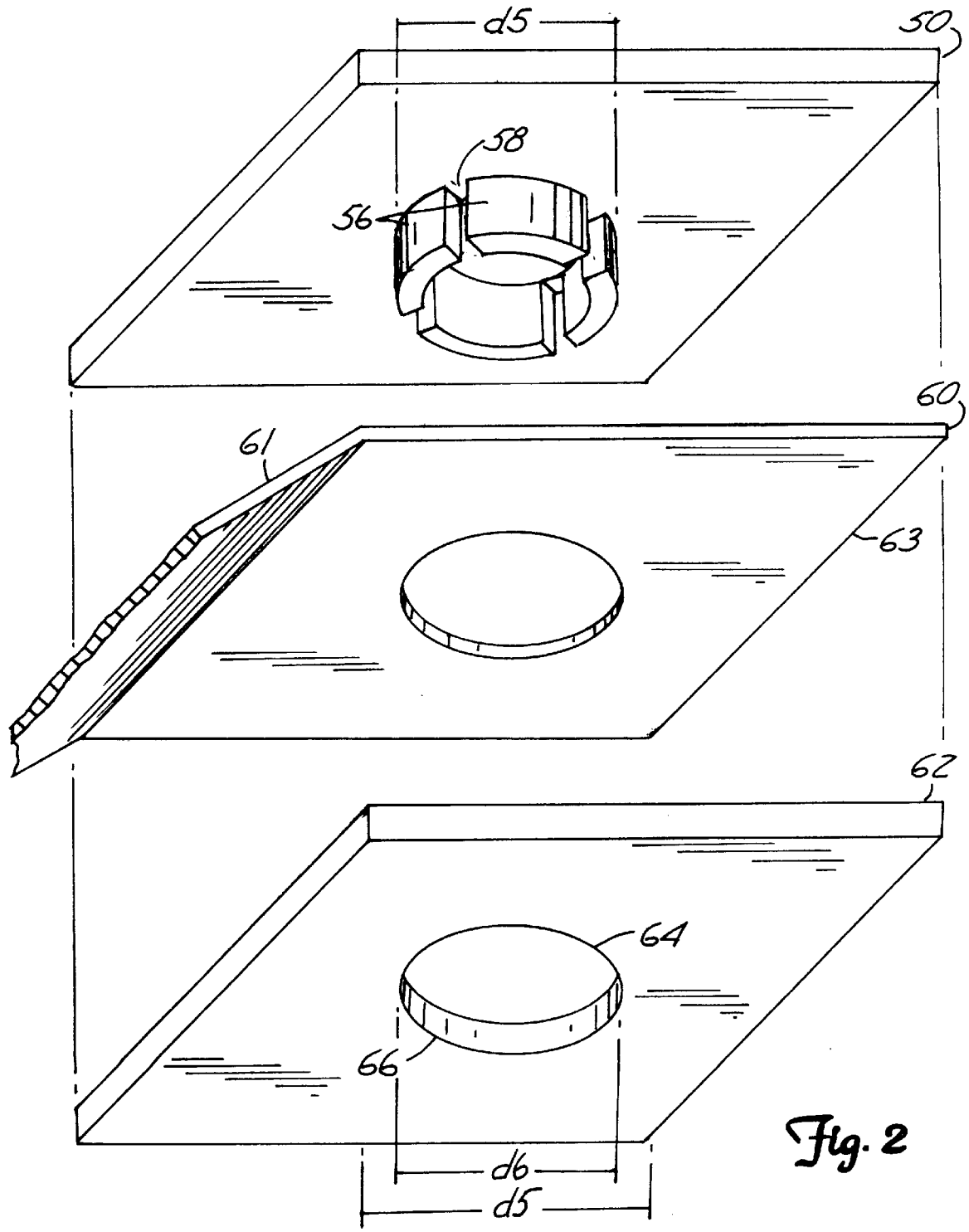
FIG. 2 shows an exploded view of the assembly of the base plate with an actuator arm and a head/gimbal assembly according to the present invention.

FIGS. 1–3 illustrate a swage connection according to the present invention. As shown in FIG. 1, a preferred embodiment of base plate 50 includes flange portion 54 and plurality of raised portions 56 defining a cylinder, or boss. The plurality of raised portions are separated by slots 58. The boss has relaxed outer diameter d5 and outer surface 59. In a preferred embodiment, the base plate is constructed of a polymer, such as polystyrene having a modulus of elasticity in the range of 145 to 450 Kpsi and a yield stress in the range of 4 to 9 Kpsi.

As shown in FIG. 2, head/gimbal assembly 60 is sandwiched between base plate 50 and actuator arm 62. A depending portion 61 extends from the portion 63 sandwiched between the base plate and the actuator arm, the depending portion extending to the head (not shown) of the disc drive. The actuator arm is preferably constructed of polymer, such as polystyrene having a modulus of elasticity in the range of 145 to 450 Kpsi and a yield stress in the range of 4 to 9 Kpsi, although actuator arm may be constructed of aluminum, as in the prior art. Boss 50 is first aligned with, and then pressed into, opening 64 in the actuator arm. The opening in the actuator arm has inner diameter d6 smaller than the relaxed outer diameter d5 of the boss. When the base plate, head/gimbal assembly and actuator arm are assembled, the boss is pressed into the opening in the actuator arm and is elastically deformed to conform to and bias against inner surface 66 of the actuator arm. The outer boss diameter is not greater than the diameter of the opening in the actuator arm.

As shown in FIG. 3, in the final assembly of the embodiment of FIGS. 1–3, the plurality of raised portions 56 have deformed to fit in opening 64 of actuator arm 60. As a result boss 52 has final diameter d7, equal to inner diameter d6 of the opening in the actuator arm. Because the change in outer diameter of the boss from d5 to d7 is within the elastic limits of the boss material, the final diameter d7 can be maintained by the lateral force exerted On the boss portion by the actuator arm. The exerted force contributes to the normal force between the actuator arm and the boss. The friction, and therefore the retention torque, between the boss and the actuator arm is proportional to the normal force between the two surfaces. As a result, creates an inexpensive and high retention torque base plate to actuator arm connection is obtained.

Although the present invention has been described with reference to preferred embodiments, workers skilled in the art will recognize that changes may be made in form and detail without departing from the spirit and scope of the invention.

What is claimed is:

1. A base plate for attaching a head assembly of a disc drive to an actuator arm having an opening having an inner surface, comprising:
 a flange for sandwiching a portion of the head assembly between the flange and the actuator arm; and
 means on the flange for inserting into the opening in the actuator arm and elastically deformable to conform to and continuously receive a deforming force from the inner surface of the opening so as to rigidly attach to the inner surface of the opening.

2. The base plate of claim 1 wherein the means on the flange for inserting into the opening comprises:
 a plurality of elastically deformable raised portions each having an outer surface, the outer surfaces together defining a cylinder having a relaxed outer diameter greater than the inner diameter of the opening in the actuator arm.

3. A base plate as in claim 2, wherein the plurality of portions are separated by a plurality of slots.

4. A base plate as in claim 2, wherein the raised portions of the base plate are constructed of a polymer material.

5. A base plate as in claim 2, wherein the raised portions of the base plate are constructed of a material having a yield stress in the range of 4 to 9 Kpsi.

6. A base plate as in claim 2, wherein the raised portions of the base plate are constructed of a material having a modulus of elasticity in the range of 145 to 450 Kpsi.

7. A base plate for attaching a head assembly of a disc drive to an actuator arm having an opening having an inner surface, comprising:
 a flange for sandwiching a portion of the head assembly between the flange and the actuator arm; and
 means on the flange for inserting into the opening in the actuator arm and elastically deformable to conform to and engage the inner surface of the opening to rigidly attach to the inner surface of the opening without deformation of the inner surface of the opening.

8. The base plate of claim 7, wherein the means on the flange is constructed of a polymer material.

9. The base plate of claim 8, wherein the means on the flange comprise a plurality of raised portions.

10. The base plate of claim 9, wherein the raised portions of the base plate are constructed of a material having a yield stress in the range of 4 to 9 Kspi.

11. A base plate as in claim 9, wherein the raised portions of the base plate are constructed of a material having a modulus of elasticity in the range of 145 to 450 Kpsi.

12. A base plate for attaching a head assembly of a disc drive to an actuator arm having an opening having an inner surface, comprising:
 a flange for sandwiching a portion of the head assembly between the flange and the actuator arm; and
 a plurality of deformable raised portions on the flange each having an outer surface, the outer surfaces together defining a cylinder having a relaxed outer diameter greater than the inner diameter of the opening in the actuator arm, the plurality of raised portions being insertable into the opening in the actuator arm so that the outer surfaces of the raised portions conform to and bias against the inner surface of the opening to rigidly attach to the inner surface of the opening.

* * * * *